US010958005B1

(12) United States Patent
Dube

(10) Patent No.: US 10,958,005 B1
(45) Date of Patent: Mar. 23, 2021

(54) APPARATUS FOR DIRECT CABLED CONNECTION OF FABRIC SIGNALS

(71) Applicant: Dell Products L.P., Hopkinton, MA (US)

(72) Inventor: Shawn Joel Dube, Round Rock, TX (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 16/777,983

(22) Filed: Jan. 31, 2020

(51) Int. Cl.
 *H01R 12/79* (2011.01)
 *H01R 12/73* (2011.01)
 *H01R 12/77* (2011.01)
 *G06F 1/16* (2006.01)

(52) U.S. Cl.
 CPC .......... *H01R 12/79* (2013.01); *H01R 12/737* (2013.01); *H01R 12/778* (2013.01); *G06F 1/16* (2013.01)

(58) Field of Classification Search
 CPC ...... H01R 12/79; H01R 12/737; H01R 12/77; H01R 12/735; H01R 12/73; H01R 12/72; H01R 12/71; H01R 12/70; H01R 12/777; G06F 1/16
 USPC ........................................................ 439/82
 See application file for complete search history.

(56) References Cited

U.S. PATENT DOCUMENTS

| | | | | |
|---|---|---|---|---|
| 4,686,607 A * | 8/1987 | Johnson | ............... | H01R 12/716 361/761 |
| 4,703,394 A * | 10/1987 | Petit | .................... | H05K 7/1445 361/790 |
| 5,594,621 A * | 1/1997 | van Rumpt | ............. | G06F 1/184 361/679.32 |
| 6,095,865 A * | 8/2000 | Wu | ...................... | H01R 13/658 439/607.01 |
| 6,147,871 A * | 11/2000 | DeWitt | ................. | G06F 13/409 361/752 |
| 6,287,130 B1 * | 9/2001 | Torii | .................... | H01R 12/707 439/83 |
| 7,186,121 B1 * | 3/2007 | Costello | ............. | H01R 12/7005 439/79 |
| 9,265,170 B2 * | 2/2016 | Swaminathan | .......... | H05K 7/10 |
| 9,325,086 B2 * | 4/2016 | Brodsky | ................. | H05K 3/366 |
| 9,710,421 B2 * | 7/2017 | Tamarkin | .............. | G06F 13/409 |
| 2002/0034068 A1 * | 3/2002 | Weber | .................... | H05K 1/144 361/790 |
| 2011/0059634 A1 * | 3/2011 | Chen | .................... | H01R 12/716 439/83 |
| 2011/0320690 A1 * | 12/2011 | Petersen | ............... | G06F 3/0685 711/103 |
| 2012/0170261 A1 * | 7/2012 | Hu | ......................... | H05K 3/366 362/217.16 |
| 2014/0144015 A1 * | 5/2014 | Mayer | ..................... | H01R 4/20 29/860 |
| 2016/0077841 A1 * | 3/2016 | Lambert | ............... | G06F 9/4411 713/2 |

* cited by examiner

*Primary Examiner* — Harshad C Patel
(74) *Attorney, Agent, or Firm* — Chamberlain, Hrdlicka, White, Williams & Aughtry

(57) ABSTRACT

Apparatuses for direct cabled connections of fabric signals—i.e., high-speed data signals exchanged between computer processors and peripheral devices. Specifically, varying apparatus configurations are outlined herein for minimizing, if not eliminating, the routing of these fabric signals through printed circuit boards, which tend to cause signal quality degradation due to phenomena such as the skin effect and dielectric loss.

15 Claims, 10 Drawing Sheets

APPARATUS FOR DIRECT CABLED CONNECTION OF FABRIC SIGNALS

BACKGROUND

Concerning inter-device signaling, it is becoming increasingly challenging to maintain signal quality as speeds for said signaling increase. In computing systems, fabric signals tend to be routed through one or more printed circuit boards (e.g., riser card(s) and/or backplane board(s)) interposed between computer processor(s) and peripheral device(s), which cause high loss of signal strength and/or integrity.

SUMMARY

In general, in one aspect, the invention relates to an apparatus for direct cabled connections of fabric signals. The apparatus includes a pass-through connector, including a peripheral-facing end comprising a peripheral device receptacle, a cable-facing end disposed opposite the peripheral-facing end and including a cabling connector receptacle, and a first set of signal conductors operatively connecting the peripheral device and cabling connector receptacles, and configured for fabric signal transmission.

In general, in one aspect, the invention relates to a computing system. The computing system includes an apparatus for direct cabled connections of fabric signals. The apparatus includes a pass-through connector, including a peripheral-facing end including a peripheral device receptacle, a cable-facing end disposed opposite the peripheral-facing end and including a first cabling connector receptacle, and a first set of signal conductors operatively connecting the peripheral device and cabling connector receptacles, and configured for fabric signal transmission.

Other aspects of the invention will be apparent from the following description and the appended claims.

DETAILED DESCRIPTION

Figure 1:
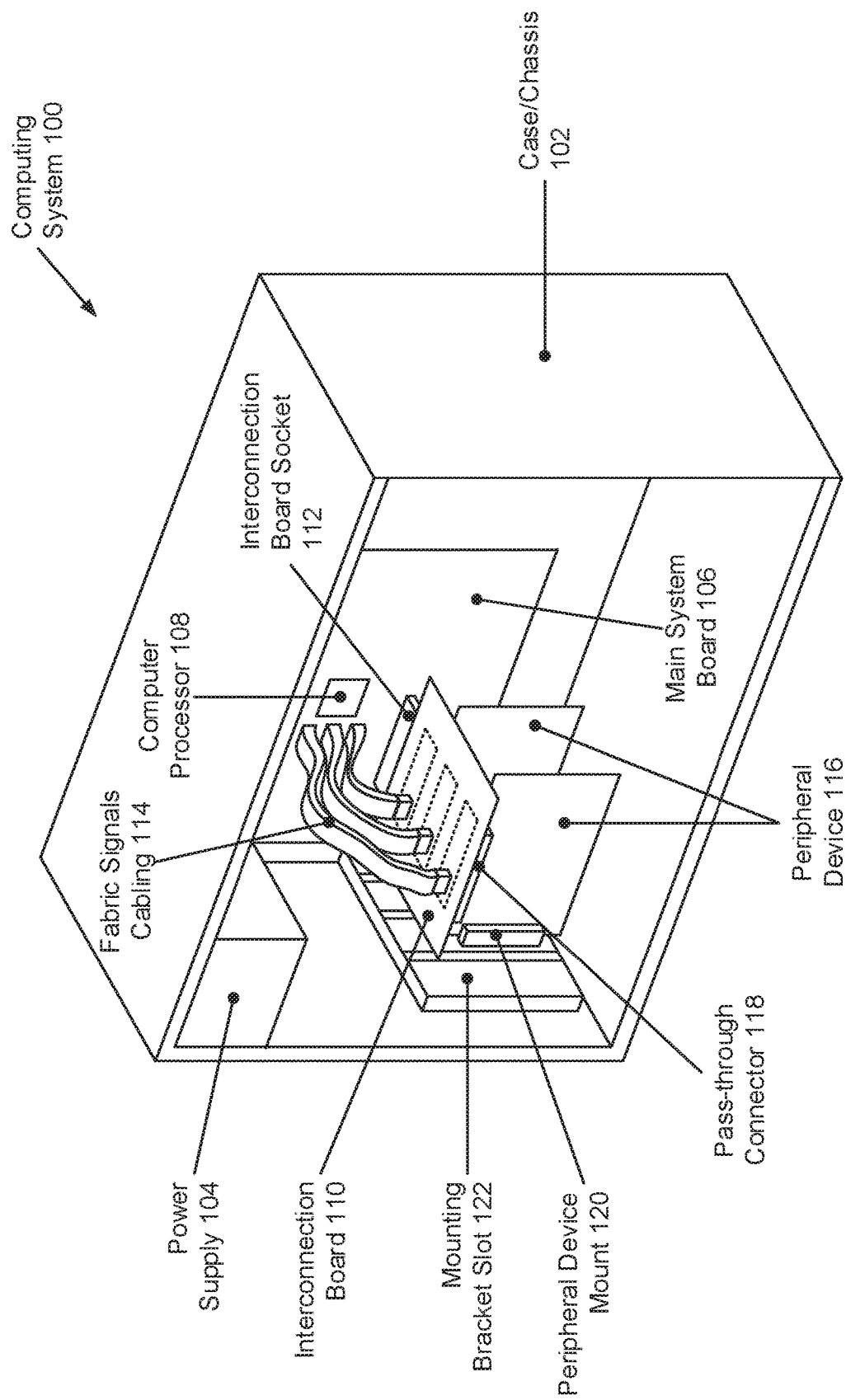
FIG. 1 shows a computing system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-4C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout the application, the phrase "directly mate(d)" may be used to describe a linear, aligned, or arranged in a straight-line connection between components. Conversely, the phrase "indirectly mate(d)" may be used to describe a nonlinear, misaligned, or not arranged in a straight-line connection between components.

In general, embodiments of the invention relate to apparatuses for direct cabled connections of fabric signals—i.e., high-speed data signals exchanged between computer processors and peripheral devices. Specifically, one or more embodiments of the invention outline varying configurations for minimizing, if not eliminating, the routing of these fabric signals through printed circuit boards, which tend to cause signal quality degradation due to phenomena such as the skin effect and dielectric loss.

Concerning inter-device signaling, it is becoming increasingly challenging to maintain signal quality as speeds for said signaling increase. Higher cost material and more complex connector solutions are usually called upon to address these challenges. In computing systems, fabric signals tend to be routed through one or more printed circuit boards (e.g., riser card(s) and/or backplane board(s)) interposed between the computer processor(s) and the peripheral device(s), which—as mentioned above—leads to high loss of signal strength and/or integrity. A strategy for improving fabric signal quality, therefore, is to rely more on cabling while minimizing the traversal of printed circuit boards. Accordingly, embodiments of the invention entail re-routing high-speed fabric signals such that these signals travel through a direct cabled connection between computer processor(s) and peripheral device(s), whereas power and sideband signals (described below) remain routed through a printed circuit board with shared circuitry.

FIG. 1 shows a computing system in accordance with one or more embodiments of the invention. The computing system (100) may include a case (102) (also referred to a chassis) serving as a structural frame or housing within which the various other, yet-to-be described components may be enclosed and/or to which one or more of these components may be affixed or mounted. The case (102) may be assembled from multiple panels (not shown) that may be fastened together using any number and any form of mechanical fasteners (not shown)—e.g., screws, bolts, latches, rivets, etc. Further, the case (102) may be constructed of lightweight, yet rigid and durable materials such as, for example, steel, aluminum, plastics, glass, carbon fiber, composites, or any combination thereof. The aforementioned other computing system (100) components, which may be housed by the case (102), may include, but are not limited to, a power supply (104), a main system board (106), an apparatus for direct cabled connections of fabric signals (i.e., assembled from at least an interconnection board (110), one or more pass-through connectors (118), and one or more fabric signals cablings (114)), and one or more peripheral devices (116). Each of these computing system (100) components is described below.

In one embodiment of the invention, the power supply (104) (also referred to as an alternating current to direct current (AC/DC) power converter) may represent a physical device designed and configured to provide operational power to one or more other computing system (100) components—e.g., the main system board (106), the apparatus, the peripheral device(s), etc. To that extent, the power supply (104) may include functionality to convert or step-down AC high-voltage from a wall socket or outlet of electricity to one or more DC low-voltages required and regulated for stable operation of the computing system (100). Furthermore, the power supply (104) may include circuitry (e.g., rectifiers, transformers, voltage dividers, voltage regulators, etc.) necessary to perform the AC/DC conversion.

In one embodiment of the invention, the main system board (106) (also referred to as a motherboard) may represent a physical printed circuit board whereon various electronic components may reside. These various electronic components may include, but are not limited to, one or more computer processors (108), non-persistent storage (not shown) (e.g., volatile memory, such as random access memory (RAM) and cache memory), one or more communication interfaces (not shown) (e.g., Bluetooth interface(s), infrared interface(s), network interface(s), optical interface(s), etc.), and numerous other elements (not shown).

In one embodiment of the invention, the computer processor(s) (108) may represent an integrated circuit for processing instructions. For example, the computer processor(s) (108) may refer to one or more cores or micro-cores of a central processing unit (CPU) and/or a graphics processing unit (GPU). The communication interface(s) may refer to physical device(s), including integrated circuits, for connecting the computing system (100) to a network (not shown) (e.g., a local area network (LAN), a wide area network (WAN) such as the Internet, a mobile network, or any other type of network) and/or to another computing system (not shown) or device.

In one embodiment of the invention, the apparatus may represent an assembly of various physical components collectively designed and configured for direct cabled connections of fabric signals. A fabric signal may refer to a high-speed data signal, which may be exchanged between the computer processor(s) (108) and a peripheral device (116). Other signals required for peripheral device (116) operation may include, but are not limited to, power (and grounding) signals for delivering DC voltages to the peripheral device (116); and sideband signals (also referred to as control and/or monitoring signals) for management of the peripheral device (116).

In one embodiment of the invention, the interconnection board (110) (i.e., a component of the above-mentioned apparatus) may represent a printed circuit board with minimal circuitry that may be shared amongst the peripheral device(s) (116). Said shared circuitry may include power and sideband signals distribution circuitry, which may be directed to powering and managing the peripheral device(s) (116), respectively. Specifically, the power signal(s) distribution circuitry may entail conductors or traces configured to relay appropriate power directly from the power supply (104) or indirectly therefrom through the main system board (106) via an interconnection board socket (112). On the other hand, the sideband signal(s) distribution circuitry may entail conductors or traces extending from a management controller (e.g., an application specific integrated circuit (ASIC), a field programmable gate array (FPGA), a microcontroller, etc.) mounted on the interconnection board (110) and operatively connected to the computer processor(s) (108). By way of examples, the interconnection board (110) may be implemented as a riser card or a backplane.

In one embodiment of the invention, the pass-through connector(s) (118) (i.e., a component of the above-mentioned apparatus) may each represent an electrical adapter designed and configured to operatively connect a given peripheral device (116) to a respective fabric signals cabling/cable (114) (described below) and the above-described shared circuitry embedded in/on the interconnection board (110). The given peripheral device (116) may mechanically and electrically couple with one end (i.e., a peripheral-facing end) of a pass-through connector (118), whereas the respective fabric signals cabling (114) may mechanically and electrically couple with at least a portion of another end (i.e., a cable-facing end) of the pass-through connector (118). Furthermore, conveyance of the various fabric, power, and sideband signals, through a pass-through connector (118), may be facilitated by a set of electrical conductors—each taking form, for example, as a separate wire, a trace, a track, a via, etc., fabricated from copper or any other conductive material. A routing (or traversal path) of the set of conductors, through the pass-through conductor(s) (118), may vary—examples of which are illustrated and described in further detail below with respect to FIGS. 2A-4C.

In one embodiment of the invention, the fabric signals cabling(s) (114) (i.e., a component of the above-mentioned apparatus) may each represent a flexible, electrical cable assembly capable of high-speed fabric signals transmission. Specifically, a fabric signals cabling (114) may encompass a set of electrical conductors (e.g., wires) terminated, at least at one end of the fabric signals cabling (114), by a cabling connector (not shown). The cabling connector may, for example, be implemented as a male plug connector (i.e., including pin contacts), a female socket connector (i.e., including receptacle contacts), a paddle board (i.e., including a male edge connector), a female edge connector socket, or any other male or female connector type. Depending on the configuration, the cabling connector may or may not also house additional electrical conductors configured for power and sideband signal transmission (see e.g., FIGS. 2A-2C).

In one embodiment of the invention, the peripheral device(s) (116) may represent any physical device, including circuitry, that may implement new or enhance existing features and/or functionalities of the computing system (100). Examples of these peripheral device(s) (116) may include, but are not limited to, graphics adapter cards, network interface cards, sound adapter cards, varying interface (e.g., Bluetooth, FireWire, Universal Serial Bus (USB), parallel, Integrated Drive Electronics (IDE), serial, Small Computer System Interface (SCSI), etc.) controller cards, etc. The peripheral device(s) (116) may also represent any physical device, including circuitry, that may incorporate persistent storage into the computing system (100). Examples of persistent storage devices may include, but are not limited to, hard disk drives (HDD), solid state drives (SSD), optical drives such as compact disk (CD) drives or digital versatile disk (DVD) drives, flash memory, etc. Furthermore, the peripheral device(s) (116) may mechanically and electrically couple to/with a peripheral-facing end of any above-mentioned apparatus (for direct cabled connections of fabric signals). The coupling may be facilitated, for example, through an edge connector (i.e., a portion of a printed circuit board including traces leading to an edge of the board that are intended to mate with a matching receptacle) integrated into the peripheral device(s) (116) or through any cable assembly capable of fabric, power, and sideband signal transmission.

While FIG. 1 shows a configuration of components, other computing system (100) configurations may be used without departing from the scope of the invention. For example, the computing system (100) may include one or more input devices (not shown) (e.g., touchscreen, keyboard, mouse, microphone, touchpad, electronic pen, etc.) and/or one or more output devices (not shown) (e.g., display, printer, external storage, speakers, etc.) that may operatively connect to the main system board (106).

Figure 2A:
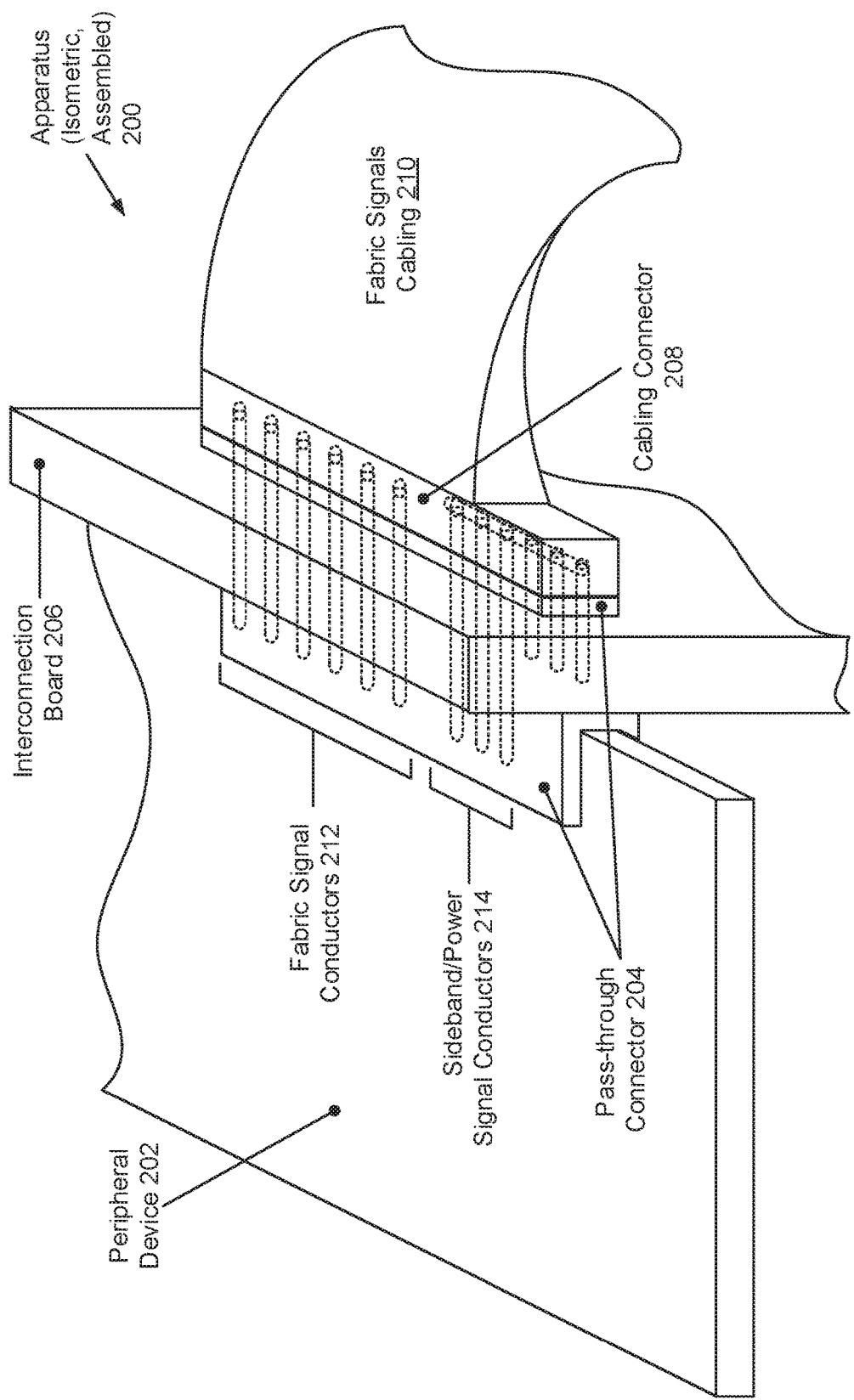
FIG. 2A shows an isometric view of an assembled apparatus for the direct cabled connections of fabric signals in accordance with one or more embodiments of the invention.
Figure 2B:
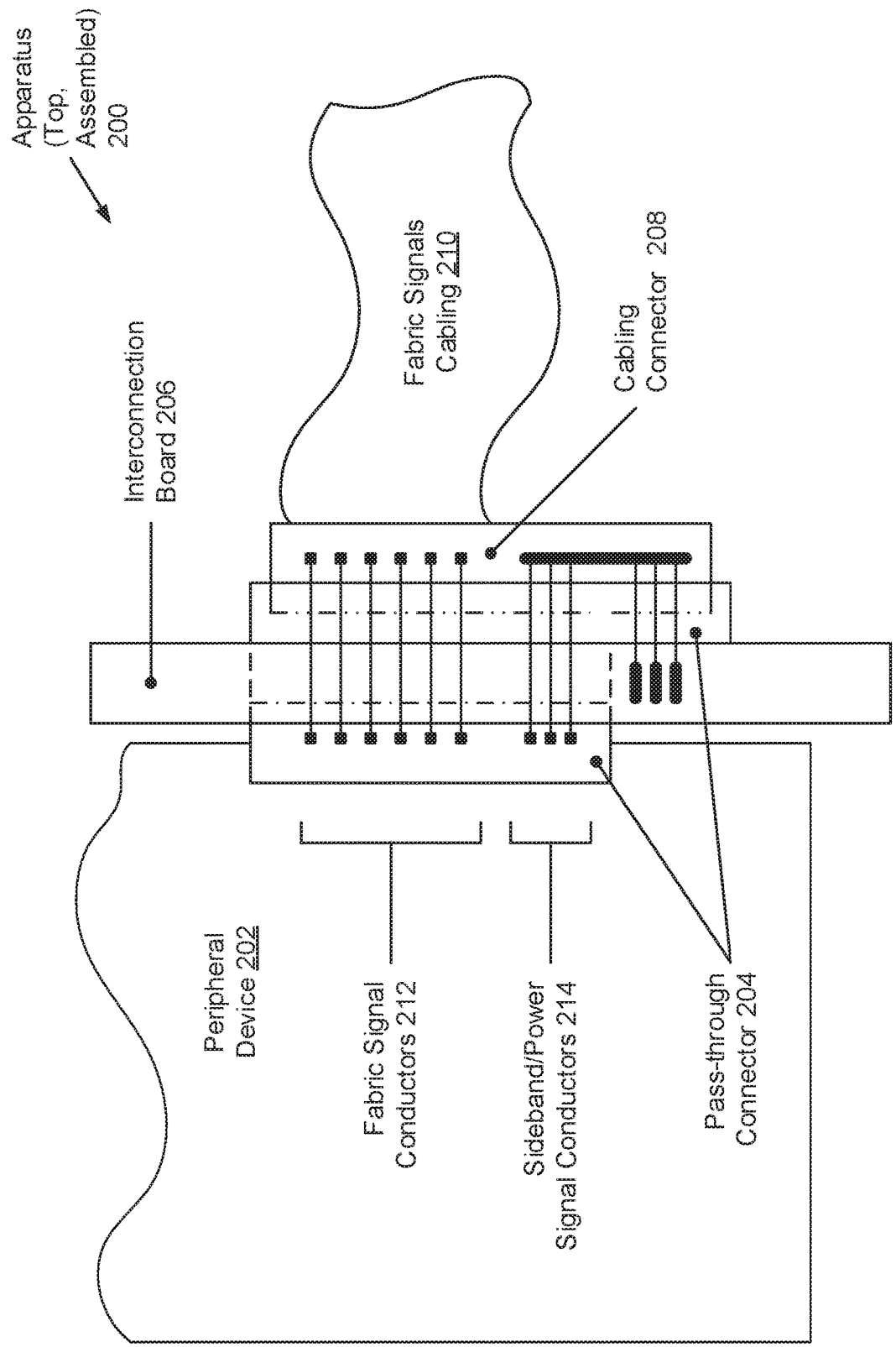
FIG. 2B shows a top view of an assembled apparatus for the direct cabled connections of fabric signals in accordance with one or more embodiments of the invention.
Figure 2C:
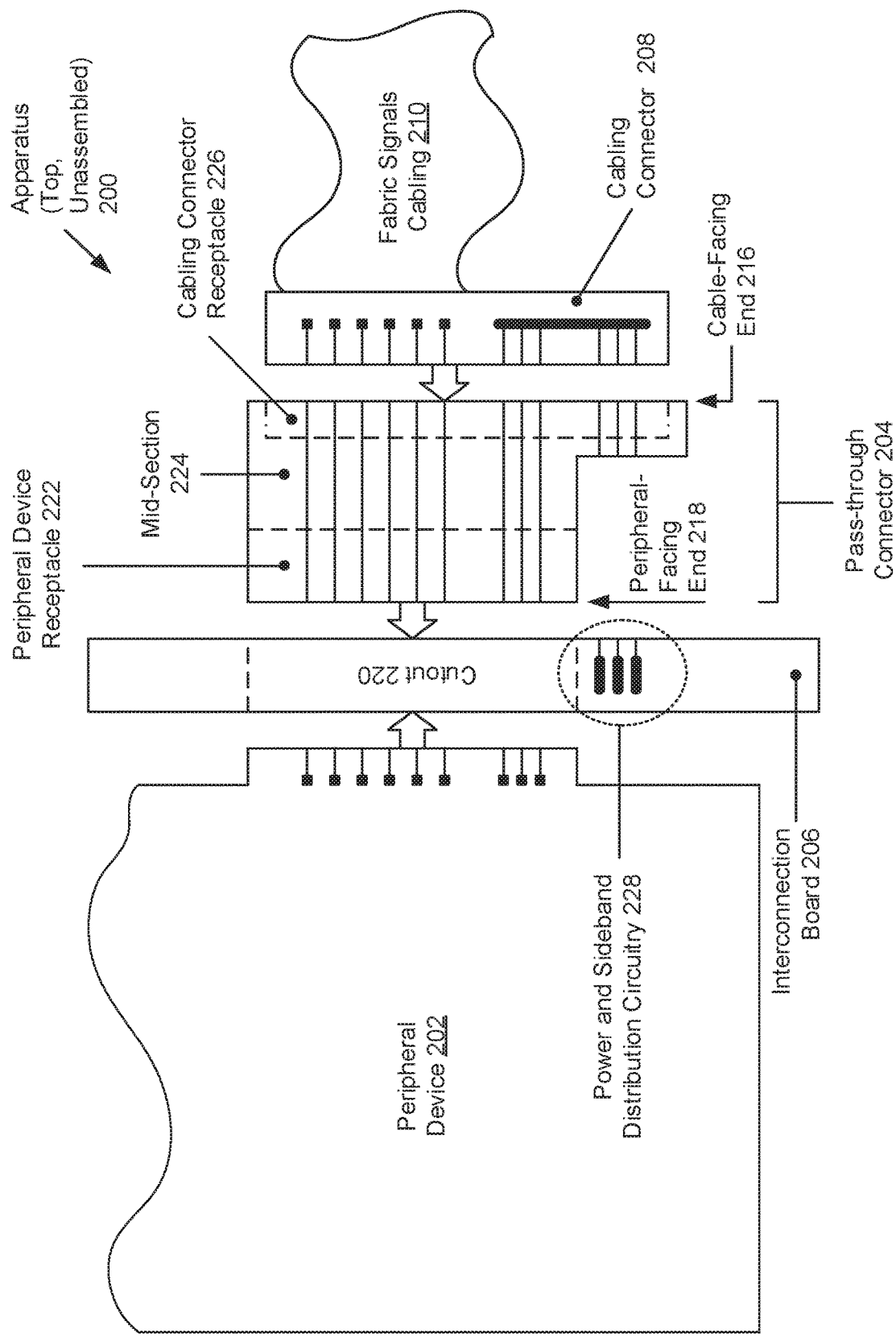
FIG. 2C shows a top view of an unassembled apparatus for the direct cabled connections of fabric signals in accordance with one or more embodiments of the invention.

FIGS. 2A-2C show an apparatus for direct cabled connections of fabric signals in accordance with one or more embodiments of the invention. Specifically, FIG. 2A illustrates an isometric view of the assembled apparatus, FIG. 2B illustrates a top view of the assembled apparatus, and FIG. 2C illustrates a top view of the unassembled apparatus. The apparatus (200) may include a pass-through connector (204), an interconnection board (206), and a fabric signals cabling/cable (210). Each of these apparatus (200) components, though discussed briefly above (see e.g., FIG. 1), is further described below.

In one embodiment of the invention, the pass-through connector (204) may represent a single, contiguous component formed from a peripheral device receptacle (222), a cabling connector receptacle (226), and a mid-section (224) interposed there-between. That is, during the manufacturing or fabrication process (e.g., by way of an injection molding operation), these various subcomponents may be merged into a single, non-fragmented component. The peripheral device receptacle (222) may be disposed at a peripheral-facing end (218) of the pass-through connector (204) and, accordingly, may be designed and configured to mechanically and/or electrically couple or interface with a peripheral device (202). On the other hand, the cabling connector receptacle (226) may be disposed opposite the peripheral-facing end (218) along a cable-facing end (216) and, accordingly, may be designed and configured to mechanically and/or electrically couple or interface with a cabling connector (208) of the fabric signals cabling (210).

In one embodiment of the invention, the pass-through connector (204) may include or house a number of electrical (signal) conductors, which may be implemented as wires, traces, tracks, vias, or any conductive conduit made from copper, any other conductive material(s), or any combination thereof. A first set of these conductors—designated the fabric signal conductor(s) (212)—may each be configured for (i.e., capable of) high-speed fabric signal transmission. The fabric signal conductor(s) (212) may traverse the entirety of the pass-through connector (204), thereby operatively connecting the peripheral device receptacle (222) to the cabling connector receptacle (226), and vice versa. More specifically, a routing (or traversal) of the fabric signal conductor(s) (212) may directly mate a first portion of the peripheral device receptacle (222) to a first portion of the cabling connector receptacle (226).

Meanwhile, in one embodiment of the invention, a second set of the above-mentioned conductors—designated the power and sideband signal conductor(s) (214)—may each be configured for power or peripheral device (202) management (i.e., control and/or monitoring) signal transmission. The power/sideband signal conductor(s) (214) may traverse the pass-through connector (204) as two separate segments. A first segment may extend from the peripheral-facing end (218) to the cable-facing end (216), thus directly mating a second portion of the peripheral device receptacle (222) to a second portion of the cabling connector receptacle (226). A second segment, on the other hand, may extend from the cable-facing end (216) to an interconnect (not shown) (e.g., one or more soldered or press-fit pins) operatively connected to the interconnection board (206). Accordingly, the second segment (via the interconnect) may facilitate a direct mating of a third portion of the cabling connector receptacle (226) to the power/sideband distribution circuitry (228) on the interconnection board (206).

In one embodiment of the invention, aside from the power/sideband distribution circuitry (228), the interconnection board (206) may include one or more cutouts (220). A cutout (220) may represent a through-hole shaped to contour the peripheral-facing end (218) of a pass-through connector (204). In assembling the apparatus (200), a pass-through connector (204) may be positioned through a cutout (220), peripheral-facing end (218) first and, subsequently, lodged (or affixed) partway there-through. While assembled with the interconnection board (206), the peripheral device receptacle (222) of the pass-through connector (204) may substantively protrude through the cutout (220) and become disposed at one side of the interconnection board (206), where the cabling connector receptacle (226) of the pass-through connector (204) substantively remains disposed at an opposing side of the interconnection board (206).

In one embodiment of the invention, the fabric signals cabling (210) may include a third set of signal conductor(s) (e.g., wires) configured for fabric signal transmission. The third set of signal conductor(s) may directly connect, at one end, to contacts (or pads) proximal to the computer processor(s) (not shown) on the main system board of a computing system (see e.g., FIG. 1). At the opposing end, however, the third set of signal conductor(s) may be terminated by a cabling connector (208), which may mechanically and electrically couple (or interface) with the cabling connector receptacle (226) at the cable-facing end (216) of the pass-through connector (204). Further, the third set of signal conductor(s) may be designed to directly mate with the above-mentioned first set of signal conductor(s) (i.e., the fabric signal conductor(s) (212))—routed through the pass-through connector (204)—at the cable-facing end (216).

In one embodiment of the invention, the cabling connector (208) may additionally house a fourth set of signal conductor(s), each of which may be configured for power or peripheral device (202) management signal transmission. More precisely, the fourth set of signal conductor(s) may route within the cabling connector (208) to indirectly mate the above-mentioned first and second segments of the power/sideband signal conductor(s) (214) (or second and third portions of the cabling connector receptacle (226)) together at the cable-facing end (216).

While FIGS. 2A-2C show a configuration of components, other apparatus (200) configurations may be used without departing from the scope of the invention. For example, in one embodiment of the invention, the interconnection board (206) may include more than one cutout (not shown) to accommodate more than one pass-through connector (not shown). Accordingly, in such an embodiment, the apparatus (200) may further include more than fabric signals cabling/cable (not shown) and corresponding cabling connector (not shown). By way of another example, in another embodiment of the invention, the number of fabric signal conductors (212) and/or sideband and power signal conductors (214) may be less or more than the number of respective signal conductors depicted throughout FIGS. 2A-2C.

Figure 3A:
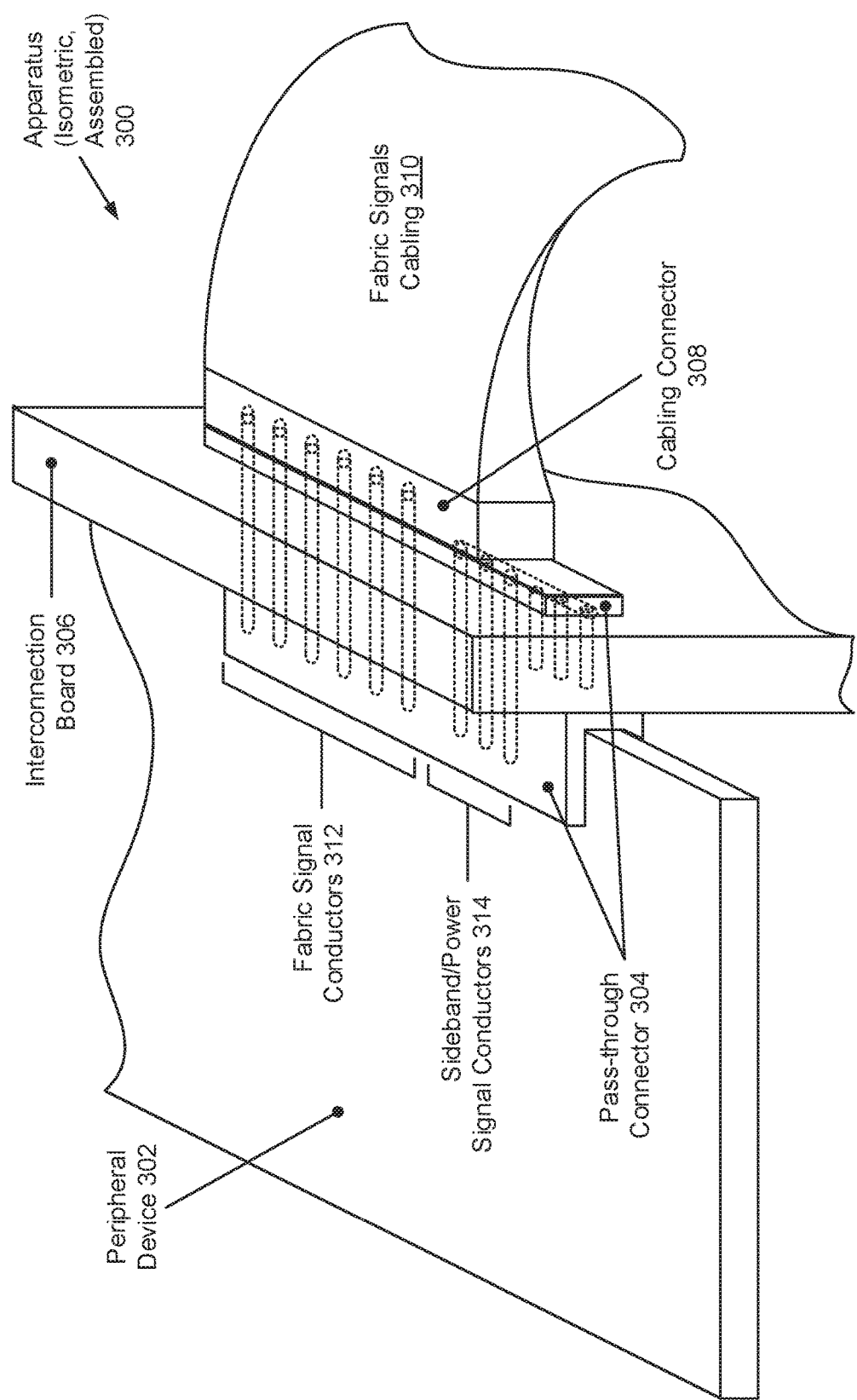
FIG. 3A shows an isometric view of an assembled apparatus for the direct cabled connections of fabric signals in accordance with one or more embodiments of the invention.
Figure 3B:
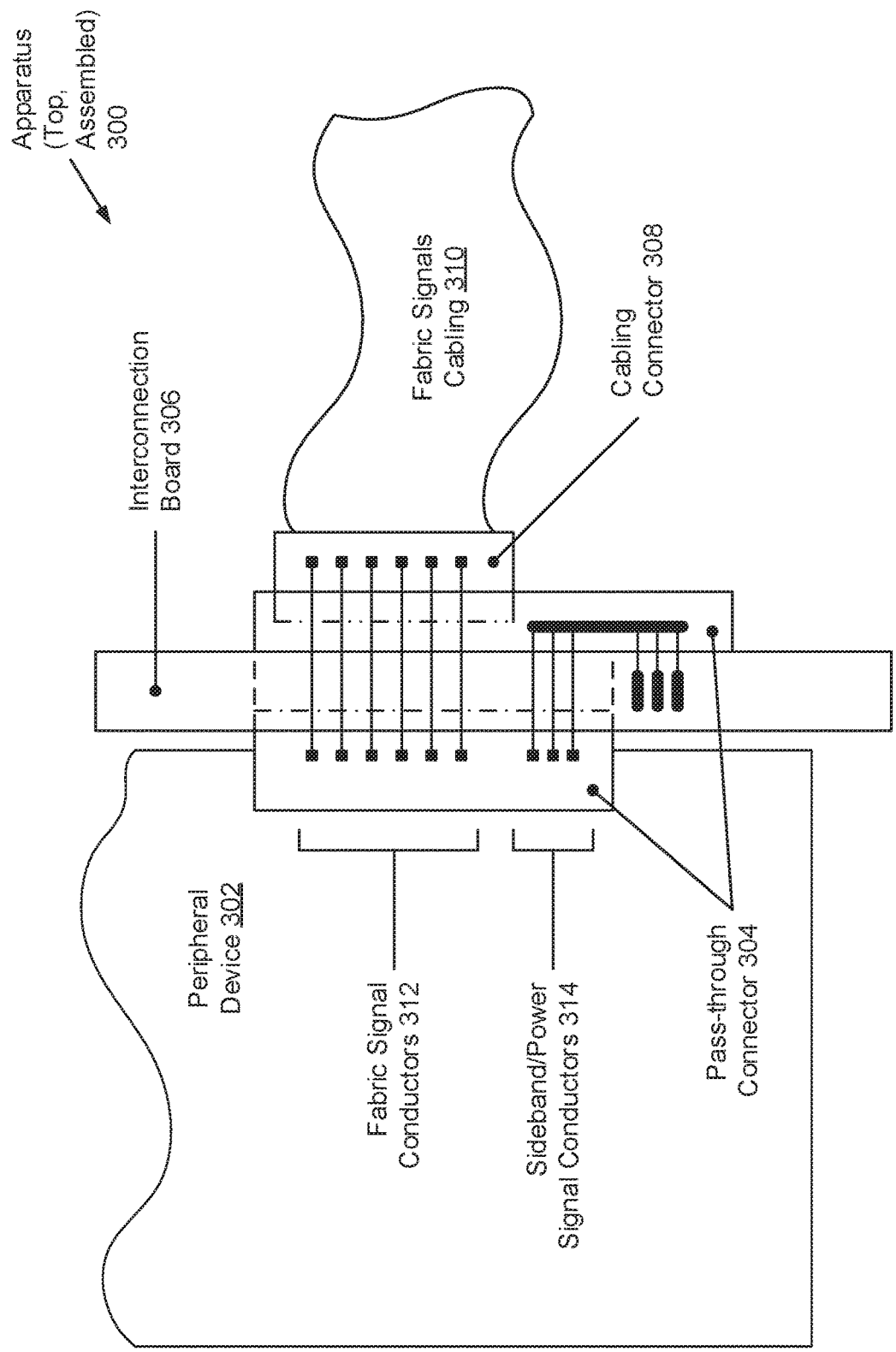
FIG. 3B shows a top view of an assembled apparatus for the direct cabled connections of fabric signals in accordance with one or more embodiments of the invention.
Figure 3C:
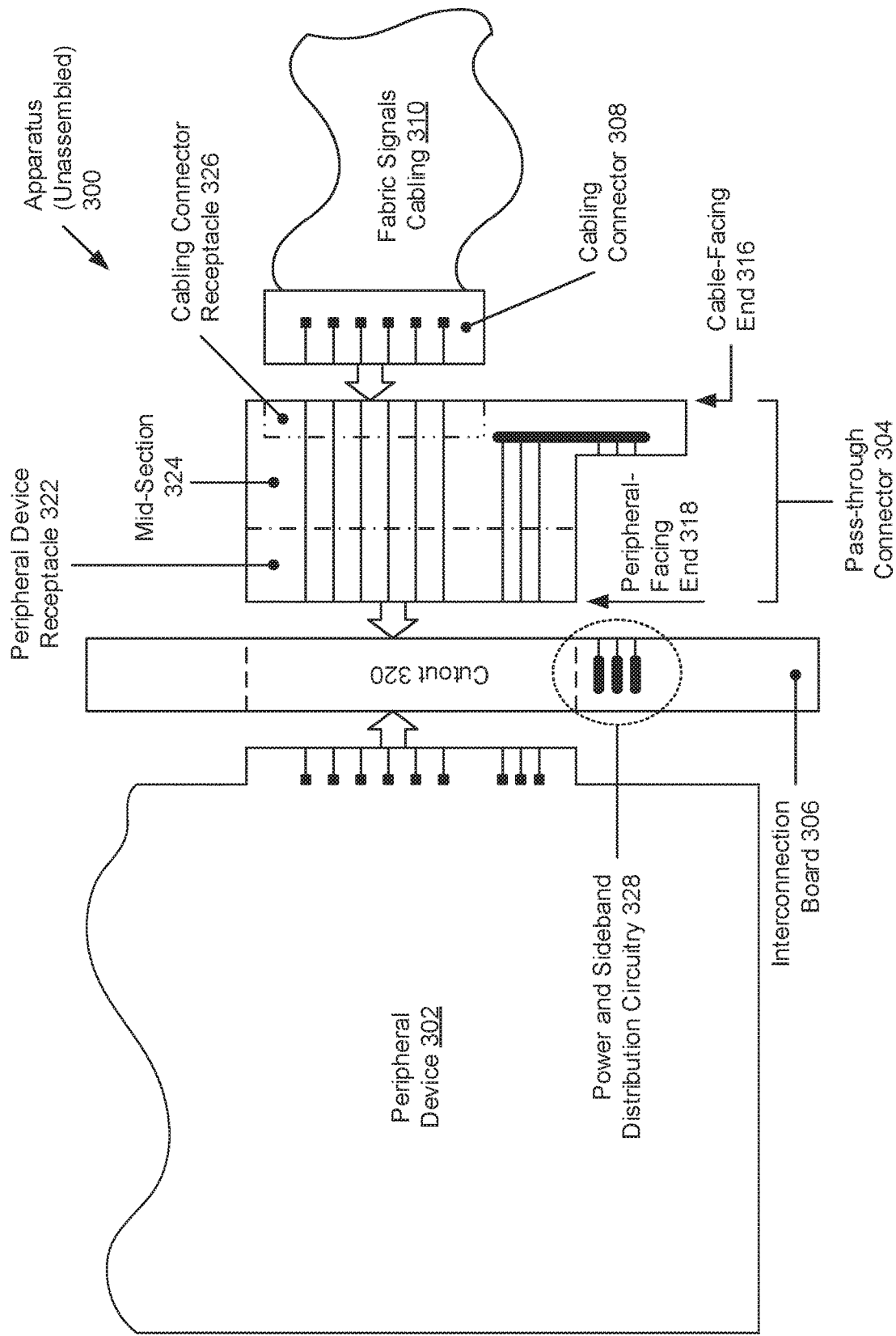
FIG. 3C shows an top view of an unassembled apparatus for the direct cabled connections of fabric signals in accordance with one or more embodiments of the invention.

FIGS. 3A-3C show an apparatus for direct cabled connections of fabric signals in accordance with one or more embodiments of the invention. Specifically, FIG. 3A illustrates an isometric view of the assembled apparatus, FIG. 3B illustrates a top view of the assembled apparatus, and FIG. 3C illustrates a top view of the unassembled apparatus. The apparatus (300) may include a pass-through connector (304), an interconnection board (306), and a fabric signals cabling/cable (310). Each of these apparatus (300) components, though discussed briefly above (see e.g., FIG. 1), is further described below.

In one embodiment of the invention, the pass-through connector (304) may represent a single, contiguous component formed from a peripheral device receptacle (322), a cabling connector receptacle (326), and a mid-section (324) interposed there-between. That is, during the manufacturing or fabrication process (e.g., by way of an injection molding operation), these various subcomponents may be merged into a single, non-fragmented component. The peripheral device receptacle (322) may be disposed at a peripheral-facing end (218) of the pass-through connector (204) and, accordingly, may be designed and configured to mechanically and/or electrically couple or interface with a peripheral device (302). On the other hand, the cabling connector receptacle (326) may be disposed opposite the peripheral-facing end (318) along a cable-facing end (216) and, accordingly, may be designed and configured to mechanically and/or electrically couple or interface with a cabling connector (308) of the fabric signals cabling (310).

In one embodiment of the invention, the pass-through connector (304) may include or house a number of electrical (signal) conductors, which may be implemented as wires, traces, tracks, vias, or any conductive conduit made from copper, any other conductive material(s), or any combination thereof. A first set of these conductors—designated the fabric signal conductor(s) (312)—may each be configured for (i.e., capable of) high-speed fabric signal transmission. The fabric signal conductor(s) (312) may traverse the entirety of the pass-through connector (304), thereby operatively connecting the peripheral device receptacle (322) to the cabling connector receptacle (326), and vice versa. More specifically, a routing (or traversal) of the fabric signal conductor(s) (312) may directly mate a first portion of the peripheral device receptacle (322) to the cabling connector receptacle (326) in entirety.

Meanwhile, in one embodiment of the invention, a second set of the above-mentioned conductors—designated the power and sideband signal conductor(s) (314)—may each be configured for power or peripheral device (302) management (i.e., control and/or monitoring) signal transmission. The power/sideband signal conductor(s) (314) may traverse the pass-through connector (304) partway and, more specifically, may indirectly mate a second portion of the peripheral device receptacle (316) to an interconnect (not shown) (e.g., one or more soldered or press-fit pins) operatively connected to the interconnection board (306). Accordingly, the power/sideband signal conductor(s) (314) (via the interconnect) may facilitate an indirect mating of the second portion of the peripheral device receptacle (322) to the power/sideband distribution circuitry (328) on the interconnection board (306).

In one embodiment of the invention, aside from the power/sideband distribution circuitry (328), the interconnection board (306) may include one or more cutouts (320). A cutout (320) may represent a through-hole shaped to contour the peripheral-facing end (318) of a pass-through connector (304). In assembling the apparatus (300), a pass-through connector (304) may be positioned through a cutout (320), peripheral-facing end (318) first and, subsequently, lodged (or affixed) partway there-through. While assembled with the interconnection board (306), the peripheral device receptacle (322) of the pass-through connector (304) may substantively protrude through the cutout (320) and become disposed at one side of the interconnection board (306), where the cabling connector receptacle (326) of the pass-through connector (304) substantively remains disposed at an opposing side of the interconnection board (306).

In one embodiment of the invention, the fabric signals cabling (310) may include a third set of signal conductor(s) (e.g., wires) configured for fabric signal transmission. The third set of signal conductor(s) may directly connect, at one end, to contacts (or pads) proximal to the computer processor(s) (not shown) on the main system board of a computing system (see e.g., FIG. 1). At the opposing end, however, the third set of signal conductor(s) may be terminated by a cabling connector (308), which may mechanically and electrically couple (or interface) with the cabling connector receptacle (326) at the cable-facing end (316) of the pass-through connector (304). Further, the third set of signal conductor(s) may be designed to directly mate with the above-mentioned first set of signal conductor(s) (i.e., the fabric signal conductor(s) (312))—routed through the pass-through connector (304)—at the cable-facing end (316).

While FIGS. 3A-3C show a configuration of components, other apparatus (300) configurations may be used without departing from the scope of the invention. For example, in one embodiment of the invention, the interconnection board (306) may include more than one cutout (not shown) to accommodate more than one pass-through connector (not shown). Accordingly, in such an embodiment, the apparatus (300) may further include more than fabric signals cabling/cable (not shown) and corresponding cabling connector (not shown). By way of another example, in another embodiment of the invention, the number of fabric signal conductors (312) and/or sideband and power signal conductors (314)

may be less or more than the number of respective signal conductors depicted throughout FIGS. 3A-3C.

Figure 4A:
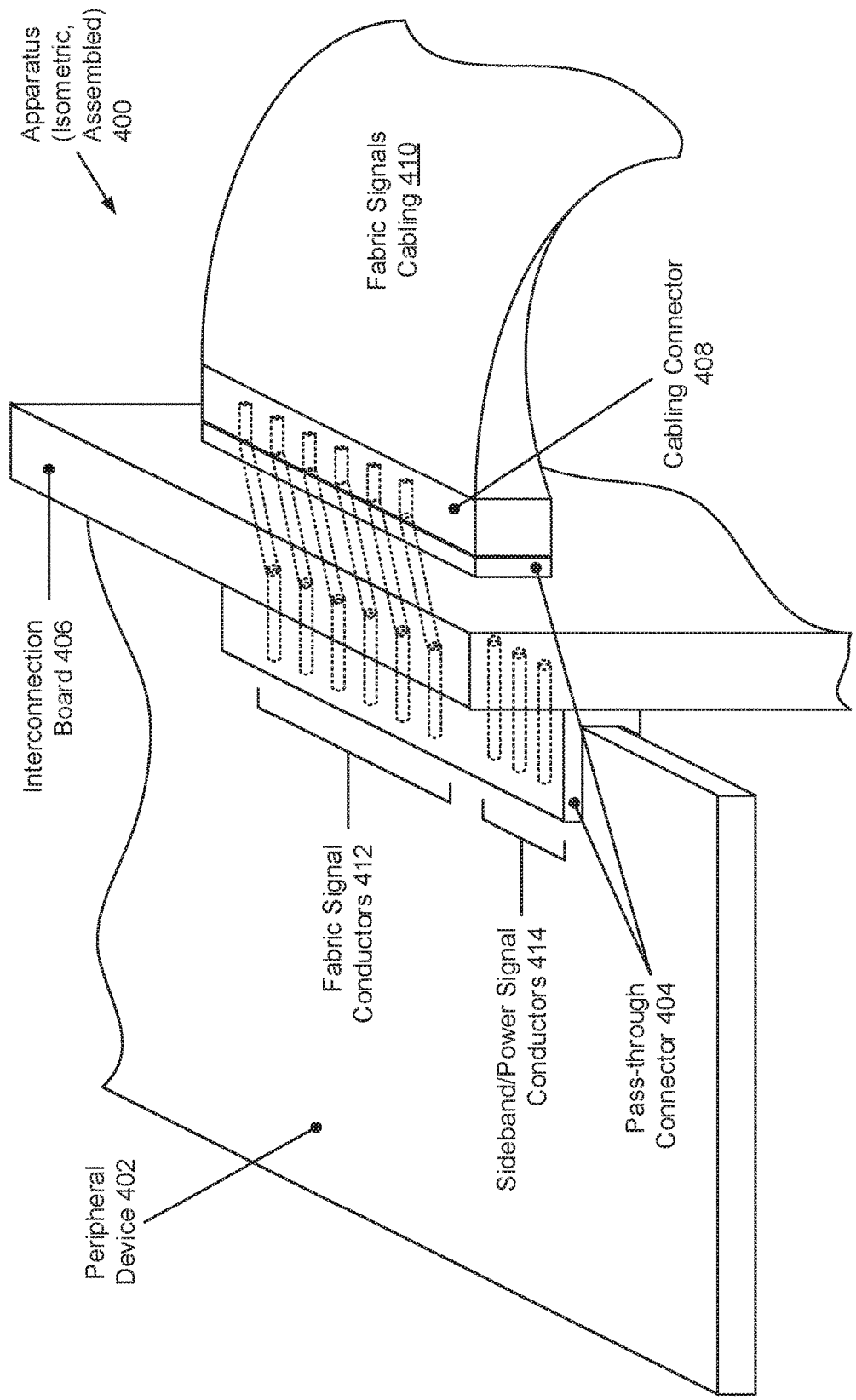
FIG. 4A shows an isometric view of an assembled apparatus for the direct cabled connections of fabric signals in accordance with one or more embodiments of the invention.
Figure 4B:
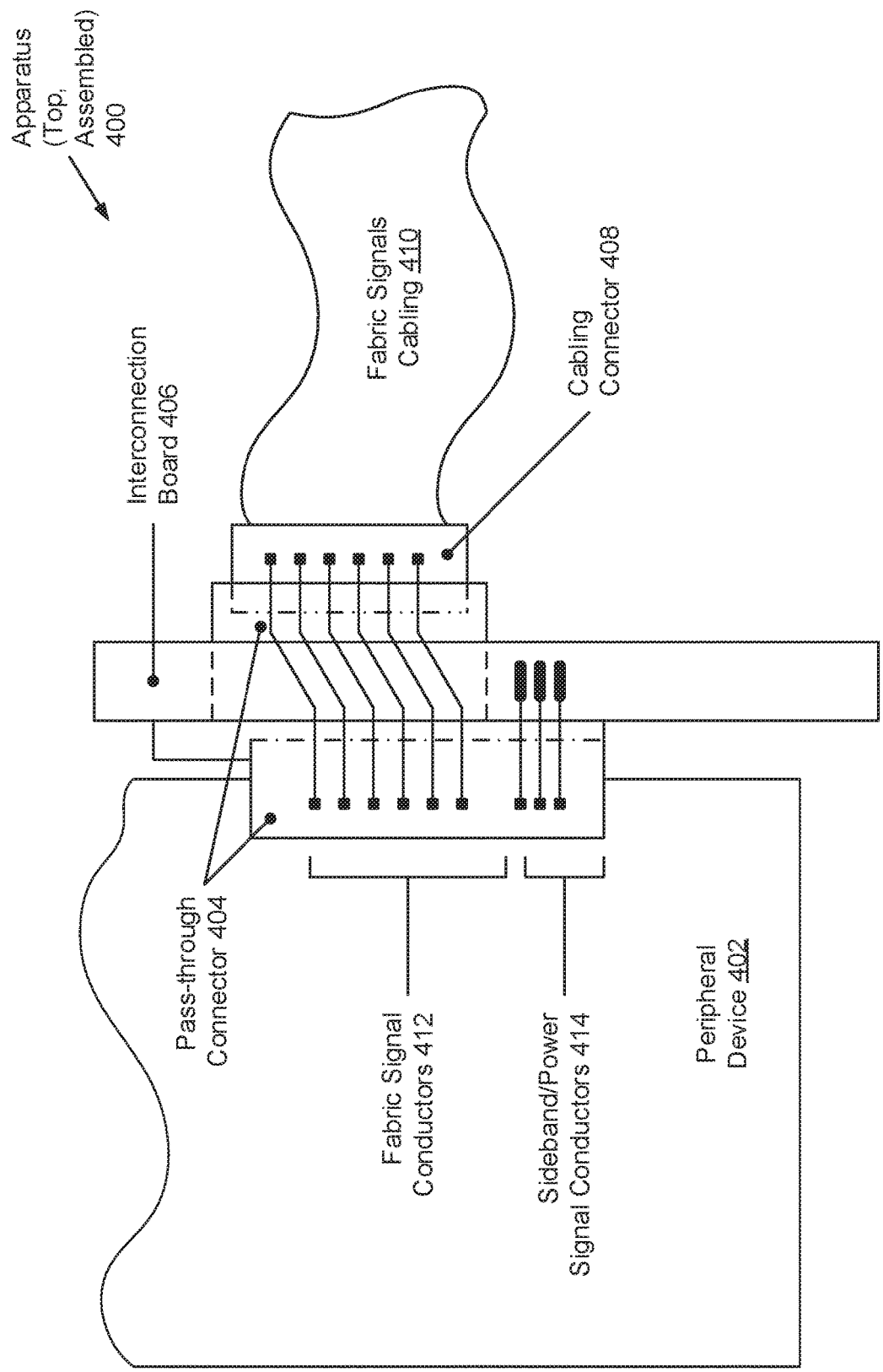
FIG. 4B shows a top view of an assembled apparatus for the direct cabled connections of fabric signals in accordance with one or more embodiments of the invention.
Figure 4C:
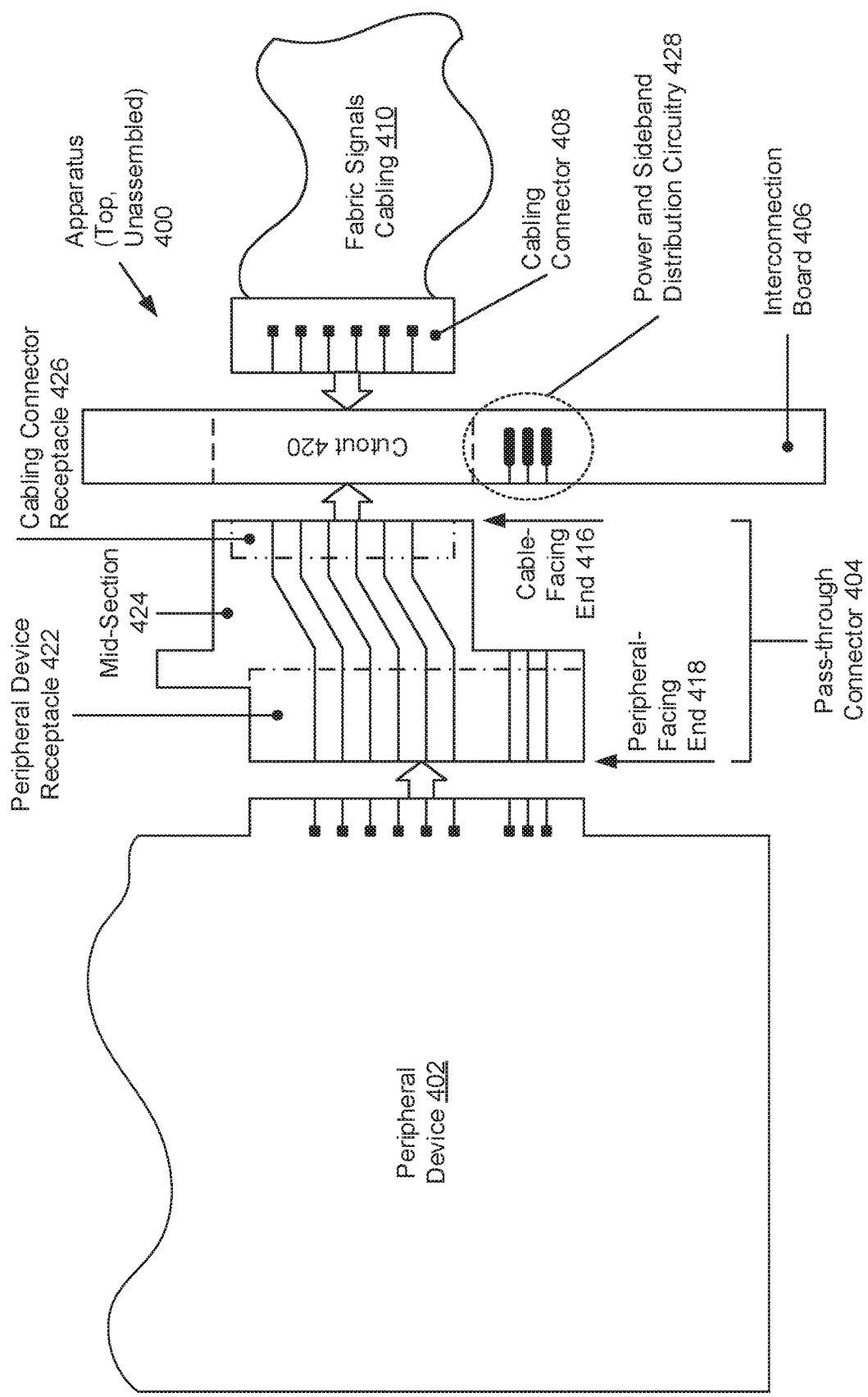
FIG. 4C shows an top view of an unassembled apparatus for the direct cabled connections of fabric signals in accordance with one or more embodiments of the invention.

FIGS. 4A-4C show an apparatus for direct cabled connections of fabric signals in accordance with one or more embodiments of the invention. Specifically, FIG. 4A illustrates an isometric view of the assembled apparatus, FIG. 4B illustrates a top view of the assembled apparatus, and FIG. 4C illustrates a top view of the unassembled apparatus. The apparatus (400) may include a pass-through connector (404), an interconnection board (406), and a fabric signals cabling/cable (410). Each of these apparatus (400) components, though discussed briefly above (see e.g., FIG. 1), is further described below.

In one embodiment of the invention, the pass-through connector (404) may represent a single, contiguous component formed from a peripheral device receptacle (422), a cabling connector receptacle (426), and a mid-section (424) interposed there-between. That is, during the manufacturing or fabrication process (e.g., by way of an injection molding operation), these various subcomponents may be merged into a single, non-fragmented component. The peripheral device receptacle (422) may be disposed at a peripheral-facing end (418) of the pass-through connector (404) and, accordingly, may be designed and configured to mechanically and/or electrically couple or interface with a peripheral device (402). On the other hand, the cabling connector receptacle (426) may be disposed opposite the peripheral-facing end (418) along a cable-facing end (416) and, accordingly, may be designed and configured to mechanically and/or electrically couple or interface with a cabling connector (408) of the fabric signals cabling (410).

In one embodiment of the invention, the pass-through connector (404) may include or house a number of electrical (signal) conductors, which may be implemented as wires, traces, tracks, vias, or any conductive conduit made from copper, any other conductive material(s), or any combination thereof. A first set of these conductors—designated the fabric signal conductor(s) (412)—may each be configured for (i.e., capable of) high-speed fabric signal transmission. The fabric signal conductor(s) (412) may traverse the entirety of the pass-through connector (404), thereby operatively connecting the peripheral device receptacle (422) to the cabling connector receptacle (426), and vice versa. More specifically, a routing (or traversal) of the fabric signal conductor(s) (412) may indirectly mate a first portion of the peripheral device receptacle (422) to the cabling connector receptacle (426) in entirety.

Meanwhile, in one embodiment of the invention, a second set of the above-mentioned conductors—designated the power and sideband signal conductor(s) (414)—may each be configured for power or peripheral device (402) management (i.e., control and/or monitoring) signal transmission. The power/sideband signal conductor(s) (414) may traverse the pass-through connector (404) partway and, more specifically, may directly mate a second portion of the peripheral device receptacle (416) to an interconnect (not shown) (e.g., one or more soldered or press-fit pins) operatively connected to the interconnection board (406). Accordingly, the power/sideband signal conductor(s) (414) (via the interconnect) may facilitate an direct mating of the second portion of the peripheral device receptacle (422) to the power/sideband distribution circuitry (428) on the interconnection board (406).

In one embodiment of the invention, aside from the power/sideband distribution circuitry (428), the interconnection board (406) may include one or more cutouts (420). A cutout (420) may represent a through-hole shaped to contour the cable-facing end (416) of a pass-through connector (404). In assembling the apparatus (400), a pass-through connector (404) may be positioned through a cutout (420), cable-facing end (416) first and, subsequently, lodged (or affixed) partway there-through. While assembled with the interconnection board (406), the cabling connector receptacle (426) of the pass-through connector (404) may substantively protrude through the cutout (420) and become disposed at one side of the interconnection board (406), where the peripheral device receptacle (422) of the pass-through connector (404) substantively remains disposed at an opposing side of the interconnection board (406).

In one embodiment of the invention, the fabric signals cabling (410) may include a third set of signal conductor(s) (e.g., wires) configured for fabric signal transmission. The third set of signal conductor(s) may directly connect, at one end, to contacts (or pads) proximal to the computer processor(s) (not shown) on the main system board of a computing system (see e.g., FIG. 1). At the opposing end, however, the third set of signal conductor(s) may be terminated by a cabling connector (408), which may mechanically and electrically couple (or interface) with the cabling connector receptacle (426) at the cable-facing end (416) of the pass-through connector (404). Further, the third set of signal conductor(s) may be designed to directly mate with the above-mentioned first set of signal conductor(s) (i.e., the fabric signal conductor(s) (412))—routed through the pass-through connector (404)—at the cable-facing end (416).

While FIGS. 4A-4C show a configuration of components, other apparatus (400) configurations may be used without departing from the scope of the invention. For example, in one embodiment of the invention, the interconnection board (406) may include more than one cutout (not shown) to accommodate more than one pass-through connector (not shown). Accordingly, in such an embodiment, the apparatus (400) may further include more than fabric signals cabling/cable (not shown) and corresponding cabling connector (not shown). By way of another example, in another embodiment of the invention, the number of fabric signal conductors (412) and/or sideband and power signal conductors (414) may be less or more than the number of respective signal conductors depicted throughout FIGS. 4A-4C.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for direct cabled connections of fabric signals, comprising:
 a pass-through connector, comprising:
  a peripheral-facing end comprising a peripheral device receptacle;
  a cable-facing end disposed opposite the peripheral-facing end and comprising a cabling connector receptacle;
  a first set of signal conductors operatively connecting the peripheral device receptacle and the cable connector receptacle, and configured for fabric signal transmission; and an interconnection board, comprising:
  a cutout shaped to contour the peripheral-facing end and through which a portion of the pass-through connector protrudes; and
 power and sideband distribution circuitry.

2. The apparatus of claim 1, wherein a routing of the first set of signal conductors directly mates a first portion of the peripheral device receptacle to a first portion of the cabling connector receptacle.

3. The apparatus of claim 2, wherein the pass-through connector, further comprises:
    second and third sets of signal conductors both configured for power and sideband signal transmission,
    wherein a routing of the second set of signal conductors directly mates a second portion of the peripheral device receptacle to a second portion of the cabling connector receptacle,
    wherein a routing of the third set of signal conductors directly mates a third portion of the cabling connector receptacle to the power and sideband distribution circuitry.

4. The apparatus of claim 3, further comprising:
    a fabric signals cable, comprising:
        a fourth set of signal conductors configured for fabric signal transmission; and
        a cabling connector configured to mate with the cabling connector receptacle and to terminate the fourth set of signal conductors at an end of the fabric signals cable,
        wherein the fourth set of signal conductors directly mates to the first set of signal conductors at the cable-facing end.

5. The apparatus of claim 4, wherein the cabling connector, comprises:
    a fifth set of signal conductors configured for power and sideband signal transmission,
    wherein a routing of the fifth set of signal conductors indirectly mates the second and third sets of signal conductors at the cable-facing end.

6. The apparatus of claim 1, wherein a routing of the first set of signal conductors directly mates a first portion of the peripheral device receptacle to the cabling connector receptacle in entirety.

7. The apparatus of claim 6, further comprising:
    a fabric signals cable, comprising:
        a second set of signal conductors configured for fabric signal transmission; and
        a cabling connector configured to mate with the cabling connector receptacle and to terminate the second set of signal conductors at an end of the fabric signals cable,
        wherein the second set of signal conductors directly mates to the first set of signal conductors at the cable-facing end.

8. The apparatus of claim 1, wherein the pass-through connector, further comprises:
    a second set of signal conductors configured for power and sideband signal transmission,
    wherein a routing of the second set of signal conductors indirectly mates a second portion of the peripheral device receptacle to the power and sideband distribution circuitry.

9. The apparatus of claim 1, wherein a routing of the first set of signal conductors indirectly mates a first portion of the peripheral device receptacle to the cabling connector receptacle in entirety.

10. The apparatus of claim 9, wherein the pass-through connector, further comprises:
    a second set of signal conductors configured for the power and sideband signal transmission,
    wherein a routing of the second set of signal conductors directly mates a second portion of the peripheral device receptacle to power and sideband distribution circuitry.

11. The apparatus of claim 9, further comprising:
    a fabric signals cable, comprising:
        a second set of signal conductors configured for fabric signal transmission; and
        a cabling connector configured to mate with the cabling connector receptacle and to terminate the second set of signal conductors at an end of the fabric signals cable,
        wherein the second set of signal conductors directly mates to the first set of signal conductors at the cable-facing end.

12. A computing system, comprising:
    an apparatus for direct cabled connections of fabric signals, and comprising:
        a pass-through connector, comprising:
            a peripheral-facing end comprising a peripheral device receptacle;
            a cable-facing end disposed opposite the peripheral-facing end and comprising a first cabling connector receptacle;
            a first set of signal conductors operatively connecting the peripheral device receptacle and the cable connector receptacle, and configured for fabric signal transmission; and an interconnection board, comprising:
                a cutout shaped to contour one selected from a group consisting of the peripheral-facing end and the cable-facing end, and through which a portion of the pass-through connector protrudes; and
            power and sideband distribution circuitry.

13. The computing system of claim 12, wherein the apparatus, further comprises:
    a fabric signals cable, comprising:
        a second set of signal conductors configured for fabric signal transmission; and
        a first cabling connector configured to mate with the cabling connector receptacle and to terminate the second set of signal conductors at an end of the fabric signals cable,
        wherein the second set of signal conductors directly mates to the first set of signal conductors at the cable-facing end.

14. The computing system of claim 13, further comprising:
    a second cabling connector receptacle;
    a computer processor operatively connected to the second cabling connector receptacle; and
    a main system board whereon the second cabling connector receptacle, the computer processor, and the apparatus are mounted,
    wherein the fabric signals cable, further comprises:
        a second cabling connector configured to mate with the second cabling connector receptacle and to terminate the second set of signal conductors at another end of the fabric signals cable.

15. The computing system of claim 12, wherein the pass-through connector, further comprises:
    at least a second set of signal conductors configured for power and sideband signal transmission,
    wherein the at least second set of signal conductors operatively connect the peripheral device receptacle to the power and sideband distribution circuitry.

* * * * *